United States Patent
Tuan et al.

(10) Patent No.: US 7,992,020 B1
(45) Date of Patent: Aug. 2, 2011

(54) POWER MANAGEMENT WITH PACKAGED MULTI-DIE INTEGRATED CIRCUIT

(75) Inventors: Tim Tuan, San Jose, CA (US); Kerry M. Pierce, Edmonds, WA (US); Albert Franceschino, Yardley, PA (US)

(73) Assignee: Xilinx, Inc., San Jose, CA (US)

( * ) Notice: Subject to any disclaimer, the term of this patent is extended or adjusted under 35 U.S.C. 154(b) by 667 days.

(21) Appl. No.: 12/043,096

(22) Filed: Mar. 5, 2008

(51) Int. Cl.
*G06F 1/00* (2006.01)
*G06F 1/26* (2006.01)
*G06F 1/32* (2006.01)

(52) U.S. Cl. ......... 713/320; 713/300; 713/323; 713/324

(58) Field of Classification Search ................ 713/320, 713/300, 323, 324
See application file for complete search history.

(56) References Cited

U.S. PATENT DOCUMENTS

| 5,809,223 | A  | * | 9/1998 | Lee et al. ......................... 714/4 |
| 7,613,934 | B2 | * | 11/2009 | Hou et al. ..................... 713/300 |
| 7,739,528 | B2 | * | 6/2010 | Zhuang et al. ................ 713/320 |

* cited by examiner

*Primary Examiner* — Mark Rinehart
*Assistant Examiner* — Jeremy S Cerullo
(74) *Attorney, Agent, or Firm* — W. Eric Webostad; LeRoy D. Maunu

(57) ABSTRACT

Power management with a packaged multi-die integrated circuit (IC) is described. A first integrated circuit die is capable of a first operational mode. A second integrated circuit die is coupled to the first integrated circuit die. The first integrated circuit die has a rate of power consumption that is lower than the second integrated circuit die when the first integrated circuit die is in the first operational mode and the second integrated circuit die is in a second operational mode. The first integrated circuit die is configured for power management of the second integrated circuit die for placing the second integrated circuit die in a standby mode from the second operational mode and for returning the second integrated circuit die to the second operational mode from the standby mode.

20 Claims, 7 Drawing Sheets

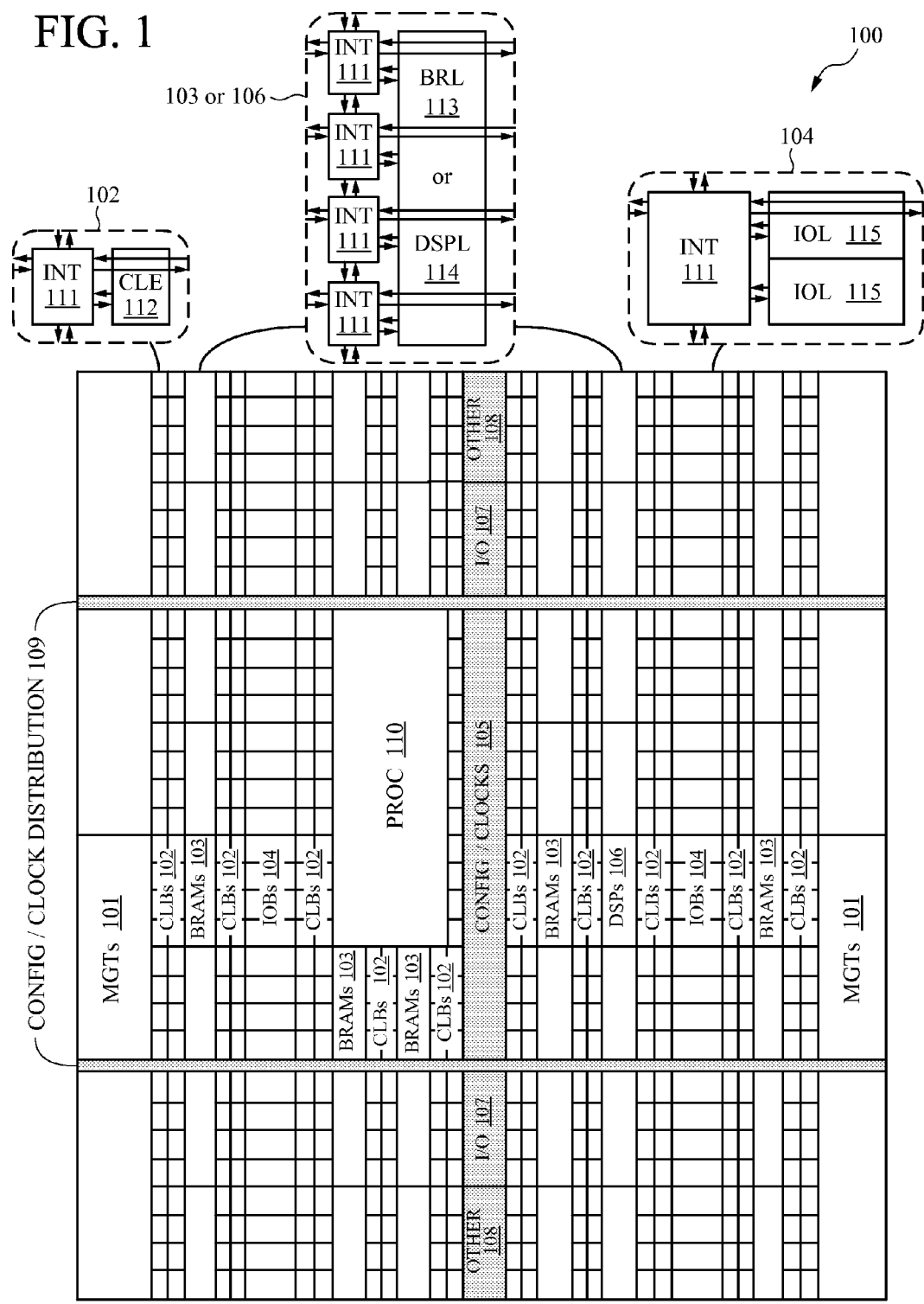

POWER MANAGEMENT WITH PACKAGED MULTI-DIE INTEGRATED CIRCUIT

FIELD OF THE INVENTION

The invention relates to integrated circuit devices (ICs). More particularly, the invention relates to power management with a packaged multi-die IC.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices (PLDs), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Heretofore, many portable or other low power applications used a chip of a host IC, such as a host IC microprocessor or host microcontroller IC, to disable the FPGA's supplied power to put the FPGA in an idle state. Conventionally, this has been referred to as a "hibernate" mode. There are several drawbacks to using a host IC chip to disable power supplied to an FPGA. First, when the FPGA transitions out of a hibernate mode into a mode of operation, conventionally referred to as "waking up" the FPGA, the FPGA will not "remember" its state prior to hibernation. Secondly, having multiple IC chips in a design involves verification of interaction between such chips; such verification may be problematic with respect to transitioning the FPGA chip into and out of a hibernate mode. Thirdly, during a hibernate mode of an FPGA, conventionally a host IC chip generally was not idled in order to avoid having to add a separate controller which was maintained in an active state. Lastly, circuits powered by one or more supplies of an FPGA, or sharing a same power plane, may have to be powered down with the FPGA, which may be problematic.

SUMMARY OF THE INVENTION

One or more aspects of the invention generally relate to integrated circuit devices (ICs) and, more particularly, to power management with a packaged multi-die IC.

An aspect of the invention relates generally to a packaged multi-die integrated circuit. A first integrated circuit die is capable of a first operational mode. A second integrated circuit die is coupled to the first integrated circuit die. The first integrated circuit die has a rate of power consumption that is lower than the second integrated circuit die when the first integrated circuit die is in the first operational mode and the second integrated circuit die is in a second operational mode. The first integrated circuit die is configured for power management of the second integrated circuit die for placing the second integrated circuit die in a standby mode from the second operational mode and for returning the second integrated circuit die to the second operational mode from the standby mode.

Another aspect of the invention relates generally to a method for power management. Power is applied to a first integrated circuit die of a packaged multi-die integrated circuit. Control signaling is sent from the first integrated circuit die to power supply circuitry associated with a second integrated circuit die of the packaged multi-die integrated circuit. Power is selectively supplied to the second integrated circuit die from the power supply circuitry responsive to the control signaling, including placing the second integrated circuit die in either a standby mode or an operational mode. The standby mode has a lower rate of power consumption than the operational mode by the packaged multi-die integrated circuit.

Yet another aspect of the invention relates generally to a packaged multi-die integrated circuit. A first integrated circuit die is capable of a first operational mode. A second integrated circuit die coupled to the first integrated circuit die. The first integrated circuit die has a rate of power consumption that is lower than the second integrated circuit die when the first integrated circuit die is in the first operational mode and the second integrated circuit die is in a second operational mode. The first integrated circuit die is configured for power management of the second integrated circuit die for placing the second integrated circuit die in a standby mode from the second operational mode and for returning the second integrated circuit die to the second operational mode from the standby mode. A third integrated circuit die has a first regulator and a second regulator. The first integrated circuit die is coupled to the first regulator for receiving first power therefrom. The second integrated circuit die is coupled to the second regulator for receiving second power therefrom. The first integrated circuit die is coupled to the second regulator for selective application of the second power to the second integrated circuit for the power management.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 1 is a simplified block diagram depicting an exemplary embodiment of a columnar Field Programmable Gate Array ("FPGA") architecture in which one or more aspects of the invention may be implemented.

DETAILED DESCRIPTION OF THE DRAWINGS

Figure 2A:
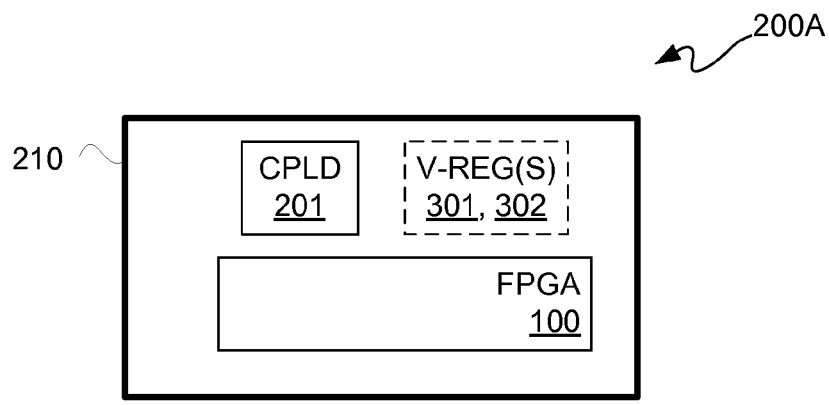
FIGS. 2A through 2C are block diagrams depicting respective exemplary embodiments of packaged multi-die integrated circuits ("ICs").

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different. Although examples are presented herein using an FPGA, the present invention is not so limited, and in general the techniques and structures presented herein may be used with any integrated circuit in a multi-die package.

As described below in additional detail, a multi-die integrated circuit package is provided for power management. Such power management as described herein is for an FPGA die of such multi-die package for transitioning such FPGA die from an operational mode to a standby mode and from the standby mode to the operational mode. By accommodating different types of die in a same package as an FPGA die, a single IC chip having FPGA capability is provided with power management features for significantly reducing static or standby power. Furthermore, as shall be appreciated from the following description, applications may take advantage of such power management features to additionally reduce dynamic power by scaling down supplied voltage. Furthermore, dynamic power may be further reduced in one or more of the embodiments described below by restoring state of an FPGA die as part of transitioning from a standby mode to an operational mode.

As noted above, advanced FPGAs can include several different types of programmable logic blocks in the array. For example, FIG. 1 illustrates an FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 2B:
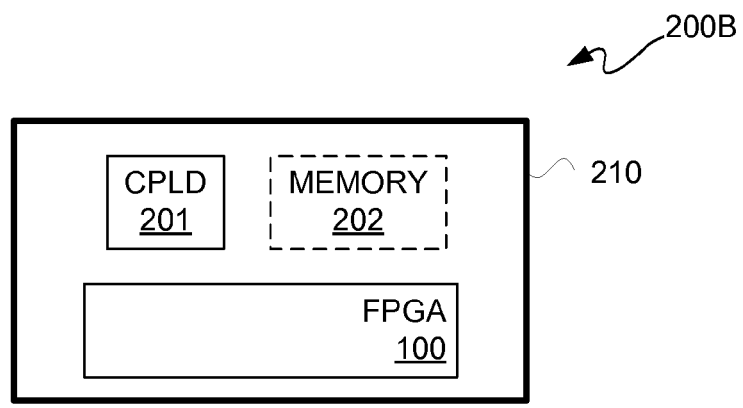
Figure 2C:
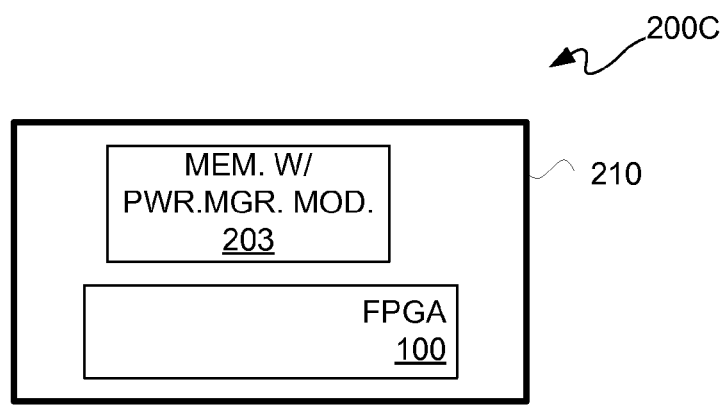

FIGS. 2A through 2C are block diagrams depicting respective exemplary embodiments of packaged multi-die ICs 200A through 200C. Though illustratively shown as having dies "floating" within a package, it should be appreciated that one die may rest upon another (e.g., in a stacked configuration) for purposes of facilitating interconnects therebetween. There are a variety of techniques that may be used for coupling die to one another, including wire bonding, ball grid arrays, lead frames, through die vias, and covalent bonding, among other known interconnect technologies that may be used. Furthermore, even though dies are illustratively shown as being located vertically above or below one another, it should be appreciated that dies may be positioned to be side by side rather than over and under. For purposes of heat removal, having dies laterally adjacent or spaced apart from one another may be useful.

With reference to FIG. 2A, packaged multi-die IC 200A includes CPLD die ("CPLD") 201 and an FPGA die, such as a die for FPGA 100 of FIG. 1, packaged in packaging material 210. Any of a variety of packaging materials as used in the semiconductor industry may be used for packaging material 210. For purposes of clarity and not limitation, interconnects between die, as well as interconnects extending to pins for coupling to the world outside of packaging material 210 are not illustratively shown.

While a CPLD 201 is illustratively shown, it will be appreciated that other circuitry may be used to provide a power management module. However, for reasons that shall be more apparent from the following description, a CPLD 201 is used for power management of FPGA die ("FGPA") 100. In other embodiments in which the die having its power managed is not an FPGA die, power management using CPLD 201 or a power management controller die may be used.

FIGS. 2B and 2C are similar to FIG. 2A. In FIG. 2B, packaged multi-die IC 200B is illustratively shown having CPLD 201, FPGA 100, and an optional memory die 202. In FIG. 2C, packaged multi-die IC 200C is illustratively shown as having a memory with power module manager die ("smart memory") 203 and FPGA 100.

With simultaneous reference to FIGS. 2A through 2C, it should be appreciated that different types of ICs may use different minimum dimension lithographies. In practice, devices such as microprocessors, FPGAs, memories, and other integrated circuits have pushed the state of the art with respect to minimum dimension lithography. However, not all such ICs push the state of the art of lithography. There are various reasons for not doing so, such as cost, scalability, reliability, power consumption, and operating parameters, among other known considerations. Thus, it should be appreciated that for example voltage regulators which tend to use substantially larger components than many of the components of an FPGA need not use the same minimum dimension lithography as FPGA 100. Likewise, CPLD 201 may be fabricated with a larger minimum dimension lithography than FPGA 100. Thus, by mixing lithographies having different minimum dimensions within a packaged multi-die IC, cost may be reduced while tailoring scalability.

Optionally, one or more below-described voltage regulators may be included as part of one or more separate dies for providing on-chip voltage regulation as part of any of packaged multi-die ICs 200A through 200C. Likewise, optional voltage regulators 301, 302 as illustratively shown in FIG. 2A may optionally be included in either or both of ICs 200B or 200C. Furthermore, memory die ("memory") 202 illustratively shown in FIG. 2B may likewise optionally be included as part of IC 200A of FIG. 2A. Thus, it should be appreciated that any of a variety of combinations of dies for forming a packaged multi-die IC with power management capabilities may be employed as described herein. For purposes of clarity by way of example and not limitation, it shall be assumed that power management is provided using CPLD 201 and that the die having its power managed is FPGA 100. However, as previously indicated, other types of die may be used for power management and receiving such power management.

It should be appreciated that CPLD 201 may use substantially less power than FPGA 100 when both are in a mode of operation. In some low power applications, CPLD 201 may be left on while having FPGA 100 in a standby state. Alternatively, CPLD 201 may be turned off or put into a low power consumption mode, namely a consumption mode that is lower than its normal mode of operation, when FPGA 100 is in a standby state. However, for purpose of clarity and not limitation, it shall be assumed that CPLD 201 is in a normal mode of operation when FPGA 100 is in a standby state.

Figure 3A:
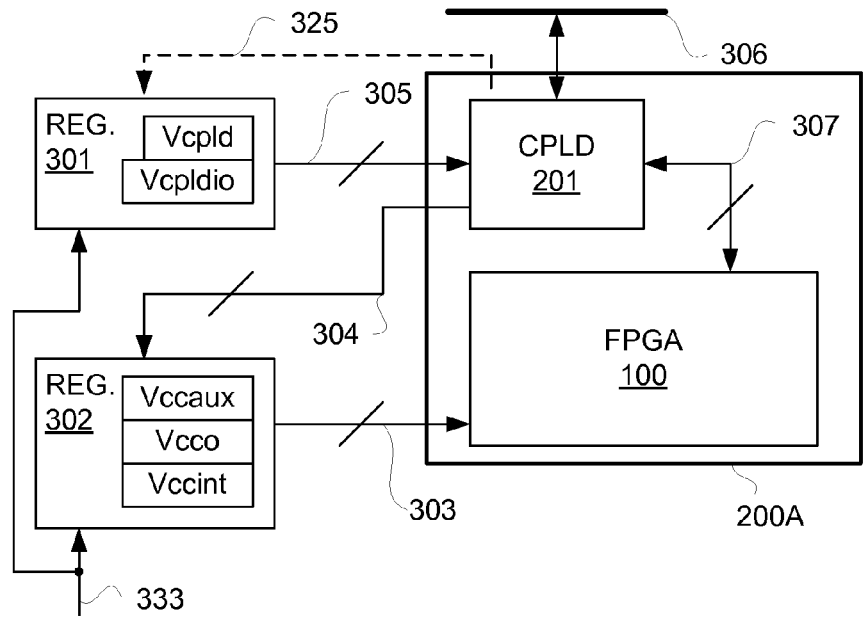
FIGS. 3A through 3C are block diagrams depicting exemplary embodiments of the ICs of FIGS. 2A through 2C, respectively, coupled to an external bus and to voltage regulators.

FIG. 3A is a block diagram depicting an exemplary embodiment of IC 200A coupled to an external bus 306 and to voltage regulators 301 and 302. For purposes of clarity and not limitation, it shall be assumed that voltage regulators 301 and 302 are external to IC 200A, even though one or more of voltage regulators 301 and 302 may be internal to IC 200A. Also, for purposes of clarity only one of each of voltage regulators 301 and 302 are illustratively shown; however, multiples of such voltage regulators may be used. Power 333 is provided to voltage regulators 301 and 302. Separate power inputs may be provided to regulators 301 and 302; however, it should be appreciated that regulators 301 and 302 may be powered from a common supply, as illustratively shown. Thus, if both of regulators 301 and 302 are internal to IC 200A, pin count may be reduced by using a common power supply.

Regulator 301 provides Vcpld and Vcpldio voltages to CPLD 201. These voltages are illustratively indicated as being voltages 305. CPLD 201 is coupled for communication with bus 306. Via bus 306, CPLD 201 may receive a bus command for selecting a power mode. Responsive to such a bus command for a power mode select, mode select signaling 304 may be asserted by CPLD 201 for providing to regulator 302.

Regulator 302 is capable of providing multiple voltages to FPGA 100. These voltages are illustratively shown for this embodiment as being Vccaux, Vcco, and Vccint. These voltages may be associated with FPGAs available from Xilinx, Inc., of San Jose, Calif., for instance. Even though these named voltages are illustratively shown for this embodiment, it should be appreciated that other known voltages may be used in accordance with the description herein. Voltages provided from regulator 302 are illustratively indicated as being voltages 303 and are provided to FPGA 100. Responsive to mode select signaling 304, any of these voltages 303 may or may not be provided, or may be provided at a reduced or heightened level, as described below in additional detail.

CPLD 201 is coupled to FPGA 100 via interconnects 307 for communication therebetween. There are a variety of possible interconnects, any of which or any combination of which may be used, including JTAG and a dedicated FPGA-CPLD busing interface.

Figure 3B:
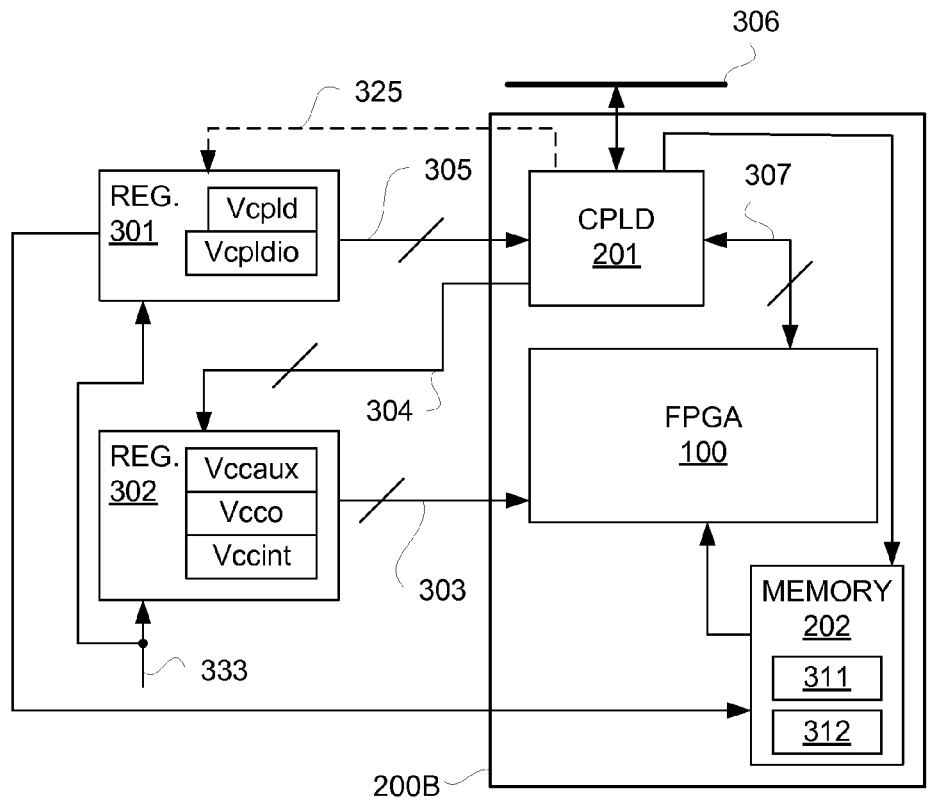

FIG. 3B is similar to FIG. 3A except that memory 202 has been added to form IC 200B. Memory 202 may include one or more sets of configuration information. For example, memory 202 may include configuration information 311 for configuring FPGA 100 to put it into a "State A." Additionally, memory 202 may include configuration information 312 for configuring FPGA 100 to put it into a "State B." Thus, it should be appreciated that FPGA 100 need not be configured to be in a same state after waking up from a standby state.

CPLD 201 is coupled to memory 202 for reading out therefrom configuration information for configuring FPGA 100. Memory 202 may be coupled to FPGA 100 via a parallel or serial interface, such as to a select map port, a JTAG port, or other configuration capable interface. Memory 202 may be a nonvolatile memory. Examples of nonvolatile memory include various types of read only memories ("ROMs") and flash memory, among other types of nonvolatile memory. During use of IC 200B, memory 202 may stay powered while FPGA 100 is in a standby mode. Memory 202 may be used to store one or more configurations 311, 312.

Figure 3C:
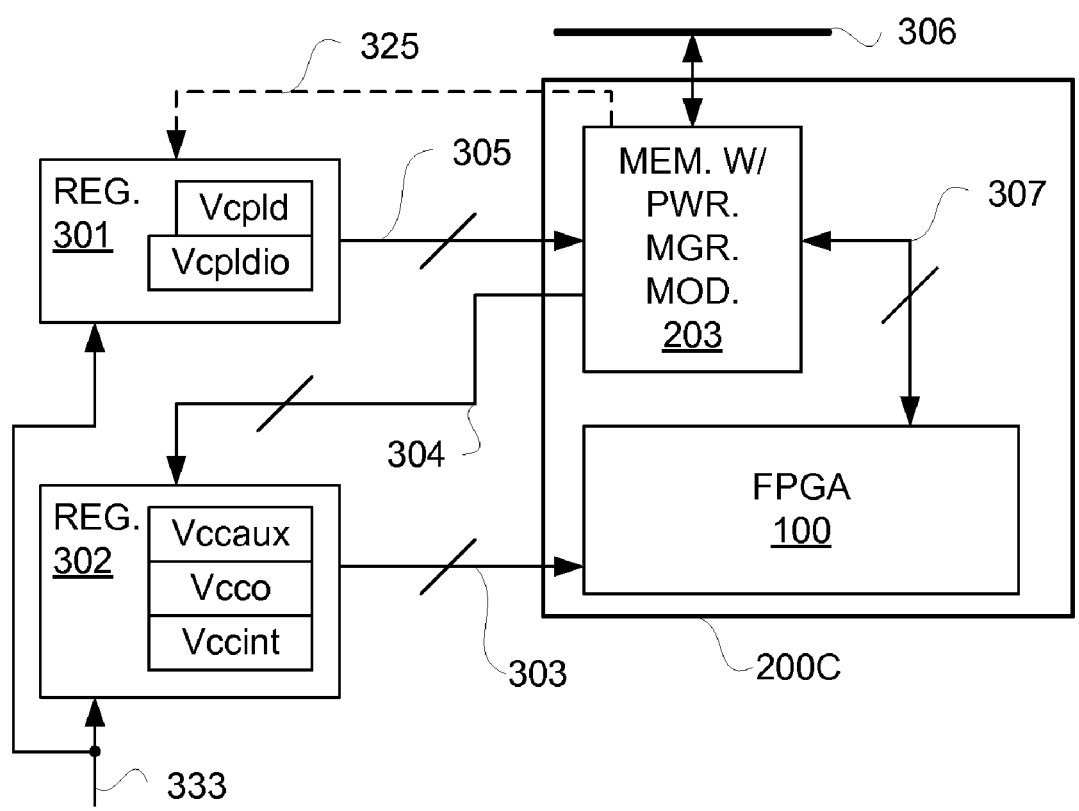

FIG. 3C is similar to FIG. 3A except that CPLD 201 is replaced with a memory die with a power management module ("smart memory") 203. Accordingly, it should be appreciated that circuitry for power management may have a substantially smaller footprint than memory used for storing configuration information. Accordingly, smart memory 203 may be used to avoid having a separate CPLD die and a separate memory.

By integrating power management in smart memory 203, system package design is simplified. Furthermore, because the power management circuitry is not speed intensive or large relative to the memory, cost and complexity of adding such power management circuitry for example to flash memory circuitry or ROM circuitry to provide smart memory 203 is likely significantly less than adding such functionality in FPGA 100. However, alternatively, power management module functionality may be added to FPGA 100.

With reference to FIGS. 3A through 3C, it should be appreciated that by having CPLD 201 separately powered by regulator 301, CPLD 201 may stay powered even if FPGA 100 is powered off from regulator 302. Likewise, regulator 301 may be used to power memory 202 such that memory 202 stays powered even though FPGA 100 is powered off. Optionally, CPLD 201 may be coupled to regulator 301 for control thereof as described below in additional detail and as generally indicated by control signaling 325. For purposes of clarity and not limitation, it shall be assumed that CPLD 201 is used in the following description even though smart memory 203 may be used instead of CPLD 201.

Figure 4:
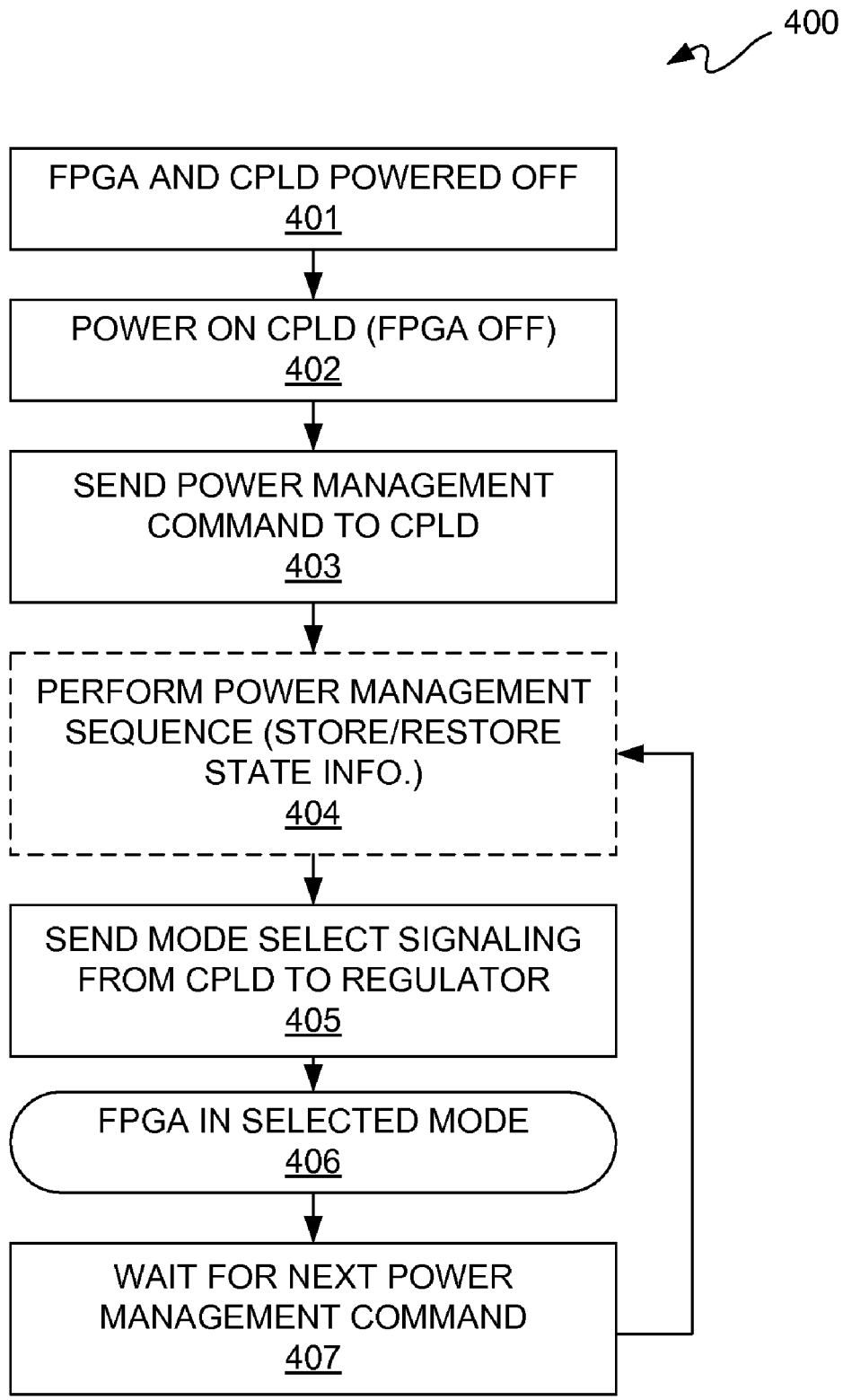
FIG. 4 is a flow diagram depicting an exemplary embodiment of a power sequence.

FIG. 4 is a flow diagram depicting an exemplary embodiment of a power sequence 400. Power sequence 400 is further described with reference to FIGS. 2A through 2C, 3A through 3C, and 4.

At 401, FPGA 100 and CPLD 201 are powered off. At 402, CPLD 201 is powered on while leaving FPGA 100 powered off. At 403, a power management command is sent to CPLD 201, such as via bus 306. In response to such power management command, CPLD 201 provides mode select signaling 304 to regulator 302, which may cause FPGA 100 to power up. Optionally, at 404, a state retention sequence may be communicated from CPLD 201 to FPGA 100 prior to asserting mode select signaling 304 responsive to the power management command received. In other embodiments, there may not be any state retention sequence, as there may be no need to store state of FPGA 100 prior to transitioning to a standby mode. However, for purposes of clarity by way of example and not limitation, it shall be assumed that a state retention sequence is performed at 404.

At 405, mode select signaling 304 is sent to regulator 302. This mode select signaling 304 is used to turn on, turn off, or adjust one or more of voltages 303 for FPGA 100 responsive to a selected power management mode. Thus, FPGA 100 is in a selected mode at 406. At 407, CPLD 201 waits for a next power management command, and in response to receiving a next power management command may proceed to 404 for processing.

Figure 5:
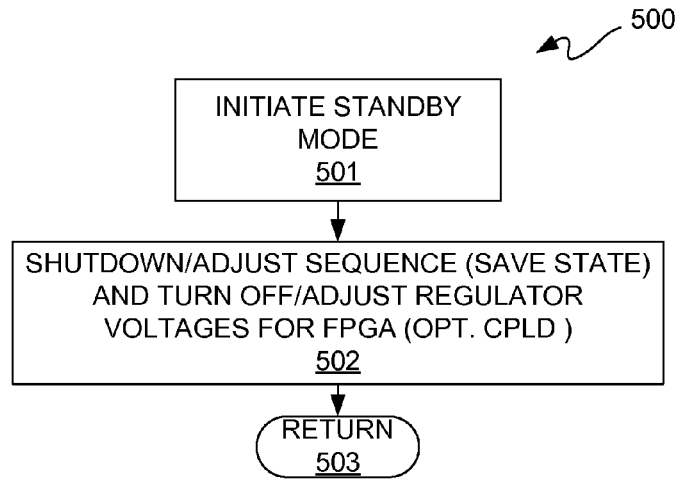
FIG. 5 is a flow diagram depicting an exemplary embodiment of state retention sequence.

FIG. 5 is a flow diagram depicting an exemplary embodiment of state retention sequence 500. State retention sequence 500 may be used for the state retention sequence at 404 of FIG. 4.

At 501, a standby mode is initiated. At 502, a shutdown/ adjust sequence responsive to initiation of a selected standby mode at 501 is performed. The shutdown sequence may include saving state of FPGA 100 in CPLD 201. For example, FPGA 100 may have registers with state bits. The state of such bits may be stored in CPLD 201 prior to transitioning FPGA 100 from an operational mode to a standby mode. It should be appreciated that CPLD 201 may include nonvolatile memory, and thus states stored therein may be retained even if CPLD 201 were to be subsequently powered off. Furthermore, depending on the size of configuration information stored in FPGA 100, such as stored in configuration memory associated with programmable logic of FPGA 100, such configuration information may be read out of FPGA 100 for storage in CPLD 201 as part of a shutdown sequence.

For transitioning FPGA 100 to a different state upon "wake up", FPGA 100 may instruct CPLD 201 as to what state it is to be in or what function is to be implemented upon power up, based on a power management command from bus 306. For example, State B may be a superset or a subset of State A. Furthermore, State B may be completely different than State A depending on the type of functionality to be used upon power up. Thus, CPLD 201 may retain state of FPGA 100 prior to entering a standby mode and indicate what state FPGA 100 is to be put into after waking up. Even though CPLD 201 may be powered off during a standby mode of FPGA 100, because CPLD 201 has nonvolatile memory, it may store information regarding in what state FPGA 100 is to be restored after "wake up" as described herein. In some embodiments, part or all of the state of FPGA 100 may be stored in another device, such as memory 202 or smart memory 203. In some embodiments, the device storing the state of FPGA 100 may include some nonvolatile memory for storing the state even if powered off.

Furthermore, as part of the shutdown sequence, regulator 302 may turn off or adjust voltages 303 provided to FPGA 100. Whether voltages are turned off or adjusted may depend upon the standby mode initiated at 501. Optionally, as part of such a standby mode, CPLD 201 may itself optionally issue control signaling 325, as illustratively shown FIGS. 3A through 3C, to cause voltages 305 to be reduced or turned off or a combination thereof for powering off CPLD 201 or placing CPLD 201 into a low power mode of operation.

At 503, CPLD 201 may be returned to send mode select signaling 304 at 405 or may be returned to wait for a next power management command at 407. State retention sequence 500 may include initiating or providing of mode select signaling 304 from CPLD 201 to regulator 302 for turning off or adjusting or a combination thereof one or more of voltages 303 provided to FPGA 100.

Figures 6A, 6B, 6C:
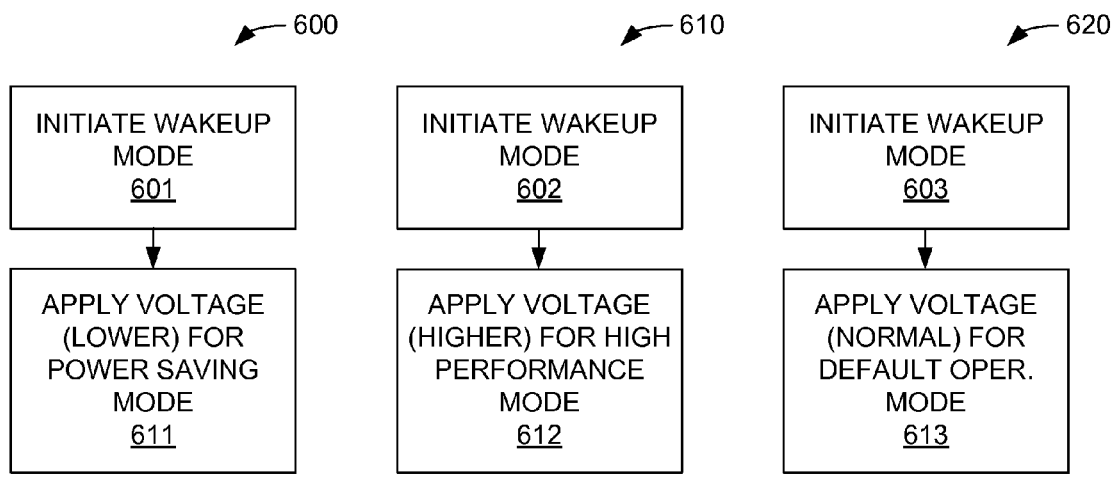
FIGS. 6A through 6C are block diagrams of respective "wake up" sequences which may be invoked responsive to a power management command.

FIGS. 6A through 6C are block diagrams of respective "wake up" sequences 600, 610, and 620 which may be invoked responsive to a power management command provided to CPLD 201. "Wake up" sequences 600, 610, and 620 are described with simultaneous reference to FIGS. 3A through 3C and 6A through 6C.

In FIG. 6A, "wake up" sequence 600 is initiated at 601 responsive to a power management command provided to CPLD 201. At 611, mode select signaling 304 is sent from CPLD 201 to regulator 302 responsive to initiation of "wake up" sequence 600. Responsive to mode select signaling 304, regulator 302 provides voltage 303 to FPGA 100. For "wake up" sequence 601, a lower voltage than a normal operating voltage is applied at 611 for a low power or power saving mode.

FIG. 6B is similar to FIG. 6A, except that a "wake up" sequence 610 initiated at 602 is for providing at 612 a higher voltage than that applied at 611. The higher voltage at 612 is for a high performance mode of operation. Lastly, FIG. 6C is similar to FIG. 6A, except that "wake up" sequence 620 initiated at 603 is used for applying a normal or default voltage level for a normal or default operative mode at 613 for operation of FPGA 100. Thus, sequences 600, 610, and 620 are respectively associated with "wake up" mode 601, 602, and 603. Voltages applied at 613 for "wake up" mode 603 allow consumption of power by FPGA 100 to be between the respective power consumption levels of "wake up" modes 601 and 602. After FPGA 100 is powered on using any of "wake up" modes 601 through 603, optionally a state restore mode may be invoked, as described below with reference to FIG. 7. Such a state restore mode may not be invoked in "wake up" mode 601 if voltage used to write to FPGA 100 is too low.

Responsive to a power management command, CPLD 201 may instruct voltage regulator 302, or voltage regulators 302 if more than one is used, to supply voltage to FPGA 100 for operation in a lower performance mode though with consuming less power as described with respect to FIG. 6A. Alternatively, as described with respect to FIG. 6C, CPLD 201 may instruct one or more voltage regulators 302 to fully supply voltage to FPGA 100 to cause it to operate in a high performance level with greater power consumption. Lastly, CPLD 201 may instruct one or more voltage regulators 302 to use default values as described with reference to FIG. 6B for a normal or default mode of operation.

Figure 7:
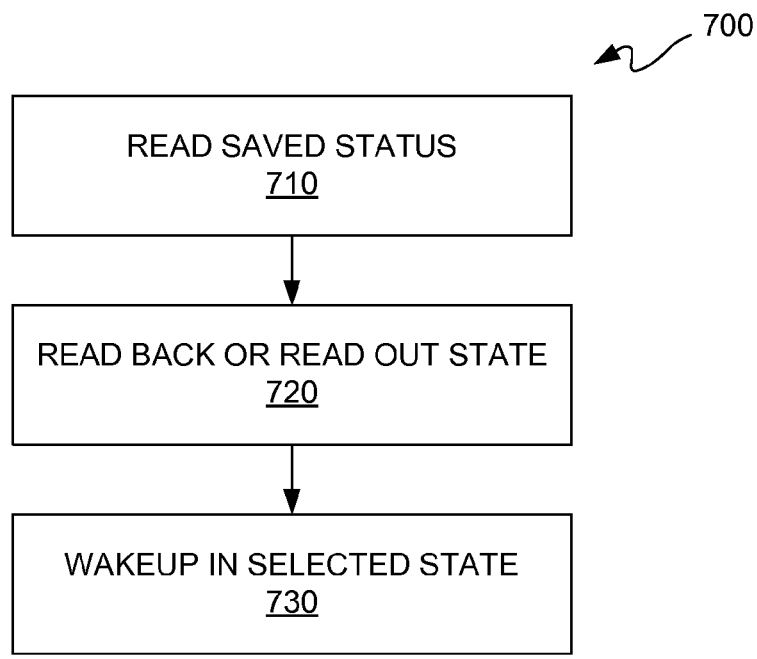
FIG. 7 is a flow diagram depicting an exemplary embodiment of a state restore sequence.

FIG. 7 is a flow diagram depicting an exemplary embodiment of a state restore sequence 700. State restore sequence 700 is further described with simultaneous reference to FIGS. 3A to 3C and 7. At 710, state for configuration of FPGA 100 may be read by CPLD 201 for causing FPGA 100 to "wake up" in State B at 730. At 720, stored state, such as may be stored at 502 of FIG. 5 as previously described, of FPGA 100 may be read back either from CPLD 201, smart memory 203, or memory 202, or a combination thereof, into FPGA 100.

At 730, FPGA 100 effectively "wakes up" in State B. States A and B may be the same. Alternatively, State B may be different than State A. Thus, for example, prior to powering down FPGA 100, register states of FPGA 100 may be read out for storage in CPLD 201, smart memory 203, or memory 202. However, storing a prior state of configuration memory may be too slow for some applications. Thus, for restoring state to FPGA 100 from a standby mode, only register states may be stored in CPLD 201, smart memory 203, or memory 202 which may involve substantially fewer bits than configuration memory bits. As reading back of configuration memory may be relatively slow, and thus may not be applicable for some uses, configuration information, such as configuration information 311 or 312 of memory 202, may be read from memory 202 and provided to FPGA 100 for writing to configuration memory thereof. This form of restoring state and instantiating a design in FPGA 100 is substantially faster than the previously described process of reading out state of configuration memory for subsequent read back. Alternatively, configuration information, such as configuration information 311 or 312, may be stored in smart memory 203.

Thus, it should be appreciated that before powering off an FPGA 100, a CPLD 201 may be used to read out register state of FPGA 100 and optionally configuration memory state of an instantiated design of FPGA 100, which may include one or more pre-defined configuration bitstreams for one or more "cores." Such state of FPGA 100 may be read out via a read back port and loaded into CPLD 201, smart memory 203, or memory 202, or a combination thereof. After transitioning from a standby mode to an operation mode, FPGA 100 may load the saved state from storage, for example from memory 202, smart memory 203, or CPLD 201, for configuration thereof. This loading may optionally be controlled by CPLD 201. Accordingly, FPGA 100 may be restored to a state it was in immediately prior to being put into a standby mode or placed in a different state.

Thus, it should be appreciated that such a standby mode may facilitate power conservation as it may be employed at various locations and times in an application where there is a sufficiently long idle period. In other words, if there is a sufficiently long idle period, state of FPGA 100 may be captured and then FPGA 100 may be put in a standby mode. The ability to idle FPGA 100 reduces power consumption during such idle period, as FPGA 100 may be restored to a target state after standby.

Figure 8:
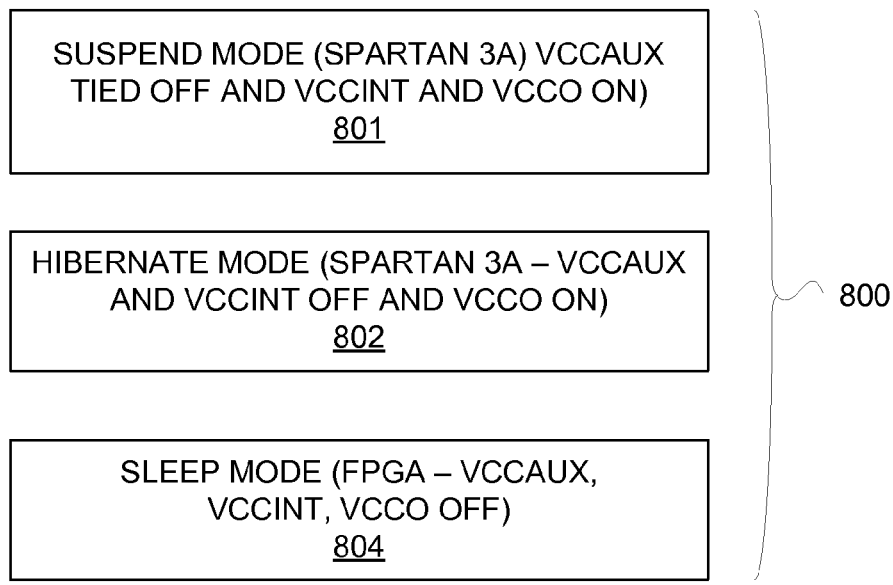
FIG. 8 is a block diagram depicting an exemplary embodiment of a set of standby states.

FIG. 8 is a block diagram depicting an exemplary embodiment of a set of standby states 800. Standby states 800 are not intended to be a complete list of all possible standby states, but are to illustratively show that there are a variety of standby modes that may be used. For example, suspend mode 801, which is presently available with a Spartan 3A FPGA available from Xilinx Inc., of San Jose Calif., may be used. In this suspend mode, some of the circuits powered by Vccaux are disabled and Vccint and Vcco are left on. Other suspend modes may involve a lowering of a voltage which is not described herein for purposes of clarity and not limitation.

A hibernate mode 802, which is available in a Spartan 3A FPGA available from Xilinx Inc., of San Jose, Calif., may be used where Vccaux and Vccint are powered off and Vcco is either left on or turned off. A sleep or hibernate mode 804 available in FPGAs of Xilinx Inc., of San Jose, Calif., may turn off Vccaux, Vccint, and Vcco.

Variations on a suspend mode may be a stop clock mode, where an FPGA's clock is temporarily stopped, and CPLD 201 may be used to control a stop clock mode. Alternatively, CPLD 201 may be employed to implement functions immediately upon receiving a power management command to transition FPGA 100 from a standby mode to an operational mode. As FPGA 100 may take some time to come up to an operational state, CPLD 201, which is active, may be used to provide such functionality until FPGA 100 is in an operational state. In other words, there may be applications where certain functionality is to be present generally immediately upon exiting a standby mode.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A packaged multi-die integrated circuit, comprising:
a first integrated circuit die;
the first integrated circuit die operable in a first operational mode;

a second integrated circuit die coupled to the first integrated circuit die;
the first integrated circuit die having a rate of power consumption that is lower than a rate of power consumption of the second integrated circuit die when the first integrated circuit die is in the first operational mode and the second integrated circuit die is in a second operational mode; and
the first integrated circuit die configured for power management of the second integrated circuit die for placing the second integrated circuit die in a standby mode from the second operational mode and for returning the second integrated circuit die to the second operational mode from the standby mode;
wherein the second integrated circuit die is further configured to instruct the first integrated circuit die as to one of two or more different states to which to be restored after waking up from the standby mode;
wherein the first integrated circuit die is further configured to:
store an indicator that identifies the one of the different states in response to the instruction from the second integrated circuit die;
access respective sets of stored state data for the two or more different states; and
in returning the second integrated circuit die to the second operational mode from the standby mode and in response to the stored indicator, configure the second integrated circuit die with the respective set of state data associated with the one of the different states.

2. The packaged multi-die integrated circuit according to claim 1, wherein:
the first integrated circuit die is coupled to a first regulator for receiving first power therefrom;
the second integrated circuit die is coupled to a second regulator for receiving second power therefrom; and
the first integrated circuit die is coupled to the second regulator for selective application of the second power to the second integrated circuit for the power management.

3. The packaged multi-die integrated circuit according to claim 1, wherein:
the first integrated circuit die is a Complex Programmable Logic Device die; and
the second integrated circuit die is a Field Programmable Gate Array die.

4. The packaged multi-die integrated circuit according to claim 1, further comprising:
a third integrated circuit die coupled to at least one of the first integrated circuit die and to the second integrated circuit die; and
the third integrated circuit die comprising a non-volatile memory operable for storing at least one configuration bitstream for configuring programmable logic of the second integrated circuit die.

5. The packaged multi-die integrated circuit according to claim 1, wherein:
the standby mode is selected from a group consisting of a suspend mode, a hibernate mode, and a sleep mode; and
the second operational mode is selected from a group consisting of a high power mode, a medium power mode, and a low power mode.

6. A method for power management, comprising:
applying power to a first integrated circuit die of a packaged multi-die integrated circuit;
sending control signaling from the first integrated circuit die to power supply circuitry associated with a second integrated circuit die of the packaged multi-die integrated circuit;
instructing the first integrated circuit die by the second integrated circuit die as to one of two or more different states to which to be restored after waking up from the standby mode;
storing by the first integrated circuit die, an indicator that identifies the one of the different states in response to the instruction from the second integrated circuit die;
storing respective sets of stored state data for the two or more different states;
selectively supplying power to the second integrated circuit die from the power supply circuitry responsive to the control signaling;
the selectively supplying including placing the second integrated circuit die in either a standby mode or an operational mode; and
the standby mode having a lower rate of power consumption than the operational mode by the packaged multi-die integrated circuit; and
in placing the second integrated circuit die in the operational mode from the standby mode and in response to the stored indicator, the first integrated circuit die configuring the second integrated circuit die with the respective set of state data associated with the one of the different states.

7. The method according to claim 6, further comprising:
providing a command via a bus to the packaged multi-die integrated circuit for the first die; and
the sending the control signaling being responsive to the command.

8. The method according to claim 7, wherein:
the command is for either the standby mode or the operational mode;
the standby mode is selected from a group consisting of a suspend mode, a hibernate mode, and a sleep mode; and
the operational mode is selected from a group consisting of a high power mode, a medium power mode, and a low power mode.

9. The method according to claim 6, further comprising:
initiating a sequence;
wherein the storing of the respective sets of stored state data includes storing state information of the second integrated circuit die responsive to the sequence; and
after storing the state information, first transitioning the second integrated circuit die from the operational mode to the standby mode.

10. The method according to claim 9, further comprising:
second transitioning of the second integrated circuit die from the standby mode to the operational mode; and
restoring the state information to the second integrated circuit die responsive to the second transitioning, wherein the state information is the respective set of state data associated with the one of the different states.

11. The method according to claim 10, further comprising loading configuration information into the second integrated circuit die for the second transitioning.

12. The method according to claim 11, wherein storing the state information comprises storing at least a portion of the state information in a third integrated circuit die, the method further comprising obtaining the configuration information from the third integrated circuit die.

13. The method according to claim 12, wherein:
the first integrated circuit die is a Complex Programmable Logic Device die;

the second integrated circuit die is a Field Programmable Gate Array die; and the third integrated circuit die comprises a non-volatile memory of the packaged multi-die integrated circuit.

14. The method according to claim 11, wherein storing the state information comprises storing at least a portion of the state information in the first integrated circuit die, the method further comprising obtaining the configuration information from the first integrated circuit die.

15. The method according to claim 14, wherein the first integrated circuit die comprises a memory with power management circuitry configured to generate the control signaling and to store and to restore the configuration information.

16. A packaged multi-die integrated circuit, comprising:

a first integrated circuit die;

the first integrated circuit die operable in a first operational mode;

a second integrated circuit die coupled to the first integrated circuit die;

the first integrated circuit die having a rate of power consumption that is lower than a rate of power consumption of the second integrated circuit die when the first integrated circuit die is in the first operational mode and the second integrated circuit die is in a second operational mode;

the first integrated circuit die configured for power management of the second integrated circuit die for placing the second integrated circuit die in a standby mode from the second operational mode and for returning the second integrated circuit die to the second operational mode from the standby mode;

a third integrated circuit die having a first regulator and a second regulator;

the first integrated circuit die coupled to the first regulator for receiving first power therefrom;

the second integrated circuit die coupled to the second regulator for receiving second power therefrom; and the first integrated circuit die coupled to the second regulator for selective application of the second power to the second integrated circuit for the power management;

wherein the second integrated circuit die is further configured to instruct the first integrated circuit die as to one of two or more different states to which to be restored after waking up from the standby mode;

wherein the first integrated circuit die is further configured to:

store an indicator that identifies the one of the different states in response to the instruction from the second integrated circuit die;

access respective sets of stored state data for the two or more different states; and in returning the second integrated circuit die to the second operational mode from the standby mode and in response to the stored indicator, configure the second integrated circuit die with the respective set of state data associated with the one of the different states.

17. The packaged multi-die integrated circuit according to claim 16, wherein the first regulator and the second regulator are respective first and second voltage regulators commonly powered from at least one power supply input pin.

18. The packaged multi-die integrated circuit according to claim 17, wherein:

the first integrated circuit die is a Complex Programmable Logic Device die; and the second integrated circuit die is a Field Programmable Gate Array die.

19. The packaged multi-die integrated circuit according to claim 17, further comprising:

a fourth integrated circuit die coupled to at least one of the first integrated circuit die and to the second integrated circuit die; and the fourth integrated circuit die comprising a non-volatile memory operable for storing at least one configuration bitstream for configuring programmable logic of the second integrated circuit die.

20. The packaged multi-die integrated circuit according to claim 17, wherein:

the standby mode is selected from a group consisting of a suspend mode, a hibernate mode, and a sleep mode; and the second operational mode is selected from a group consisting of a high power mode, a medium power mode, and a low power mode.

* * * * *